Patented Nov. 24, 1942

2,302,927

UNITED STATES PATENT OFFICE 2,302,927

PRODUCTION OF FEED OR FEED SUPPLEMENTS

Clarence Walter Whitmoyer and William James Moore, Myerstown, Pa., assignors to Whitmoyer Laboratories, Inc., Myerstown, Pa., a corporation of Delaware No Drawing. Application July 1, 1940, Serial No. 343,436

8 Claims. (Cl. 99—2)

This invention relates generally to the production of a feed or feed supplements primarily for feeding animals, poultry and the like.

More specifically the invention relates to the production of a feeding material consisting of protein and fat derived from fish or offal, carbohydrates derived from a vegetable or like source, which material is further characterized by the retention therein of vitamins conducive to health and growth promotion.

In animal and poultry nutrition, in addition to water, three main food factors are essential; namely, protein, fat and carbohydrates. Moreover, vitamins and minerals are required. All of these factors are supplied to the body through food where imposed conditions require living in partly or wholly confined quarters.

Proteins are considered as necessary for building cell tissue. Fat in the diet is deposited as such and may be used as a source of energy. Carbohydrates serve to a great extent also as a source of energy although other values may be attributed to them. It is believed that minerals serve as catalysts for carrying on body processes at their optimum rate for best health. Vitamins need be present in comparatively small quantities but serve definite and useful purposes. The oil soluble vitamin A serves as an anti-ophthalmic, anti-infective and growth-promoting factor. Oil soluble vitamin D serves as an anti-rachitic agent, particularly where the animal body is not sufficiently exposed to the sunlight to receive sufficient anti-rachitic activation from that source.

In poultry nutrition particularly and to a more limited degree in animal nutrition, the so-called growth-promoting factors consisting of factors usually referred to as the vitamin B complex which under this designation includes material known as riboflavin, often called vitamin G or vitamin $B_2$, are or great importance. In fact, riboflavin is considered as absolutely essential in the diet of poultry breeding stock for production of good hatchable eggs.

Both the oil soluble vitamins A and D and also water soluble vitamins including the aforementioned growth-promoting factors are found in raw fish. Moreover, fish is high in protein content. Accordingly, a substantial industry has been developed to produce from fish and offal a commodity called "fish meal" which is used as an animal and poultry feed or feed supplement. In producing fish meal it has been common practice to steam or cook the fish prior to dehydration because of certain difficulties encountered when attempts were made to dehydrate raw or uncooked fish. Although cooking sterilizes the product to prevent putrefaction of the resultant fish meal it has the disadvantage of destroying valuable vitamins. And frequently the cooking, if done by live steam, results in a condensate, which normally is discarded as waste "press-water." The press-water contains not only water soluble vitamins extracted from the fish but also nutritive water soluble proteins. This press-water is usually thrown away as waste.

According to the present invention these valuable health and growth-promoting factors and nutrients are not discarded as waste but are retained in the resultant product. Fish which is high in protein and fat content is utilized with a material which is high is carbohydrates to produce a ration containing, if desired, predetermined amounts of protein, fat and carbohydrates together with the other valuable nutrient and growth and health-promoting factors mentioned in the foregoing.

Moreover, steaming or cooking of the fish with consequent destruction of vitamins is unnecessary according to this invention as the treatment is such that the raw fish may be processed by grinding together with water absorbent material and the mixture dehydrated at relatively low temperatures.

To accomplish these desirable ends the invention contemplates the use of a comminuted or farinaceous material having water absorptive properties and which itself may be the source of nutriment. This material may be intimately intermixed with raw uncooked, minced, ground or otherwise comminuted, fish, offal or the like. By intimate contact between the comminuted cell tissue of the fish and moisture absorbent material the water in the tissue cells is released or extracted in such manner that the mixture may be readily dehydrated at comparatively low temperatures to produce a resultant dry, non-putrefactive product comprising an animal or poultry ration or a feed supplement containing predetermined quantities or protein, fat and carbohydrates. Furthermore, there need be little or no loss of water soluble vitamins or proteins from the source materials as they can be retained in the finished product together with such organic minerals as were originally present.

If it is desired to release or free oil contained in the raw fish or protein source material so that such freed oil may be collected separately from the resultant residue mixture, a comminuted material having water absorptive properties and containing pectin which serves to extract the water from the cell tissue and at the same time to release and free a substantial amount of the oil occluded therein, may be used. Substantially dried pomaces of sweet potato, tomato, citrus fruits and other similar pectin containing materials of the vegetable kingdom are admirably suited to the purpose. It will be noted that the above mentioned pomaces are high in carbohydrate content and low in protein content. Moreover, these pomaces have heretofore frequently been discarded as waste by-products.

On the other hand, if the oil contained in the raw fish source material is of little or no consequence, or such as to render its separate recovery economically infeasible, it may be preferable to use a comminuted or farinaceous material having water absorptive properties without record to pectin content. For example, if oil from the raw fish or source material is not to be separately recovered it is entirely practical to use such materials as bran, corn meal, soy-bean meal, ground peanut shells or other similar substances or combinations of these which have water absorbent properties and which may be comminuted for intimate mixture with ground raw fish to form a resultant farinaceous or crumbly product which may be easily dehydrated.

With respect to vitamin, protein and fat-containing source material, whole raw fish or offal may be used. Sardines, mackerel, herring, sea trout, menhaden or any fish commonly used for making fish meal or similar source material made up of protein, fat and vitamin containing cell tissue is within the contemplation of the invention; the selection being dependent upon availability, cost, the ultimate product desired, or other surrounding circumstances.

The invention further comprehends the new and novel features of operation and the new and original arrangements and combinations of steps in the process herein described and more particularly set forth in the claims and also comprehends the production of a feed or feed supplement having the general characteristics and features of utility herein set forth and claimed.

Having thus described in general the nature of the invention, the following more specific examples are set forth for purposes of illustration as to the manner and process of making products comprehended by the invention.

To produce a farinaceous substantially dry feed or feed supplement, 80 pounds of raw fish, such as whole sea trout, were ground together with 20 pounds of dried pomace of sweet potato. An ordinary meat grinder is suitable or the raw source materials may be otherwise comminuted and intimately intermixed. This will, under ordinary conditions, give a moist but farinaceous crumbly or mealy-like mass from which the moisture previously occluded in the raw fish may be readily removed by drying at a temperature low enough to prevent appreciable cooking. The farinaceous mass may be sufficiently dehydrated at a temperature of approximately 130° F. in about forty-eight hours. The temperature is a matter of choice but the dehydration should be carried out at a temperature which will not unduly cook or substantially destroy the contained vitamins. Successful drying has been accomplished at about 105° F.

When the moisture content of the mass has been reduced to about three to five per cent the resultant product will be putrefaction-resistant, substantially dry, and will contain both the water soluble and oil soluble vitamins of the fish as well as the proteins. It will weigh in the neighborhood of 30 pounds and when kept in dry condition will resist putrefaction. Its analysis will be approximately as follows:

|  | Per cent |
|---|---|
| Moisture | 3.6 |
| Fat | 24.0 |
| Protein | 31.0 |
| Ash | 10.8 |
| Fiber | 7.2 |
| Carbohydrates | 53.0 |

It will be understood that the foregoing is primarily illustrative as the percentages of the various factors will vary somewhat depending upon the condition and type of the source materials. The invention contemplates a range bounded by the limits within which the quantity of the water-absorbent material can be varied and yet obtain the desired extraction and release of water occluded in the raw protein containing tissue cells of the source material.

It will be noted that in the foregoing example all of the oil of the fish is retained in the finished product. In cases where the fish contains sufficient quantity of oil to make its separate recovery economically advantageous, the intermixed moist farinaceous mixture, prior to dehydration may be processed in a press to squeeze out free oil as the pectin containing substance will retain the extracted water during the pressing operation. A wine press is suited to this processing. The resultant press cake may then be broken up and dehydrated as above indicated.

*Example II*

80 pounds of whole fish (mackerel) were ground together in a meat grinder with 30 pounds of wheat bran. The ground mass was intimately mixed and then dried for several days at about 130° F. after which it was again ground. The dried and ground batch weighed 48½ pounds and was farinaceous and crumbly.

The resultant product analyzed as follows:

|  | Per cent |
|---|---|
| Moisture | 5.2 |
| Fat | 32.0 |
| Protein | 43.2 |
| Ash | 9.5 |
| Fiber | 5.5 |
| Carbohydrates | 36.0 |

A product thus made if kept dry will be non-putrefactive and will contain both water soluble vitamins and proteins as well as oil soluble vitamins. As will be apparent from the analysis it will serve as a feed or feed supplement.

*Example III*

(a) 70 pounds of menhaden fish were ground together with 30 pounds of soy-bean meal. The batch was intimately intermixed for about five minutes. The resultant mixture was then dehydrated at a temperature of 105° to 130° F. until substantially all the moisture was evaporated leaving a dry farinaceous residue. The weight was approximately half of the original weight of the combined raw fish and soy-bean meal. The dried product analyzed as follows:

|  | Per cent |
|---|---|
| Moisture | 3.40 |
| Crude protein | 46.50 |
| Crude fat | 25.50 |
| Crude fiber | 4.00 |
| Ash | 10.50 |
| Carbohydrates | 14.60 |

(b) The same procedure was followed as described in (a) above except that 30 pounds of dried pomace of tomato was substituted for soybean meal. The resultant product was likewise farinaceous and analyzed as follows:

| | Per cent |
|---|---|
| Moisture | 3.00 |
| Crude protein | 33.70 |
| Crude fat | 20.57 |
| Crude fiber | 18.09 |
| Ash | 10.50 |
| Carbohydrates | 32.04 |

*Example IV*

(c) 75 pounds of menhaden fish were ground together with 25 pounds of substantially dry pomace of citrus fruit (oranges) and the ground mass intermixed sufficiently to insure intimate contact between the fish and pomace. The mixture was then dried at a temperature of 105° to 130° F. until the residue was substantially dry. After thus evaporating off the moisture from the mix the weight of the residue was about half the original weight of the combined fish and pomace. The resultant dry farinaceous product analyzed as follows:

| | Per cent |
|---|---|
| Moisture | 3.60 |
| Crude protein | 28.50 |
| Crude fat | 18.00 |
| Crude fiber | 8.12 |
| Ash | 10.75 |
| Carbohydrates | 39.95 |

(d) The same procedure was followed as described in (c) above except that 25 pounds of pomace of sweet potato was substituted for the citrus pomace. The final product analyzed as follows:

| | Per cent |
|---|---|
| Moisture | 3.60 |
| Crude protein | 24.86 |
| Crude fat | 23.77 |
| Crude fiber | 7.05 |
| Ash | 6.20 |
| Carbohydrates | 42.32 |

From the foregoing it will be seen that a valuable feed or feed supplement may be produced having high nutritive and growth-promoting value from relatively cheap and often discarded material. The oil soluble and water soluble vitamins of the original source materials as well as the water soluble proteins may be retained in the finished product together with the organic minerals and in such form as to be admirably suited for feeding to animals or poultry. The resultant product will be dry and resistant to putrefaction. Moreover, the product in addition to containing an evenly and predetermined distribution of animal and vegetable proteins, organic minerals, particularly iodine, oil soluble vitamins and water soluble vitamins, will also contain predetermined quantities of fat, protein and carbohydrates. Furthermore, the product will not putrefy if properly kept.

Not only are the valuable proteins and vitamins of the raw fish retained but materials such as by-product pomaces which are high in carbohydrates and low in protein may be utilized to make them excellent feeding materials. For instance, the pomace of sweet potato may contain only about 2% protein. It may contain about 72% carbohydrates. The product of the invention, however, may, if desired, be made to contain protein ranging from approximately 15% to 50%, depending on the quantities of source materials utilized in the process. Also, the fat content may be controlled and, if desired, may vary from approximately 15% to 30%. The carbohydrates may vary from approximately 10% to 50%. If desired, the product may be dehydrated down to 2% moisture, but a higher moisture content is satisfactory.

On the one hand, the invention comprehends the utilization of animal proteins and retains them and they are produced in proper mechanical condition for drying and feeding thus making them valuable feeding material. On the other hand, vegetable pomace materials which are low in protein may be treated to produce a product high in proteins to make them valuable feeding materials.

Quantities of from approximately 20% to 50% of pomace and 50% to 80% of raw fish or offal may be used with satisfactory results. The quantities, of course, will depend largely on the moisture content of the tissue, the type of raw material being processed and the type of finished product which is desired. The concentration of the vitamin content and the protein level of the finished product can be regulated by adjustment of the amount and kind of the various water absorbent materials which are used. The concentration of vitamins and proteins will also vary with different kinds and types of fish tissue used.

In instances where oils from the fish are not separately removed or substantial quantities are retained in the final product they will show in the analysis as "fats." For this reason the fat content of products made according to the foregoing examples may seem high for an animal or poultry feed. However, it is within the contemplation of the invention to use such products, if desired, as a feed supplement rich in vitamins and growth-promoting factors while incidentally containing quantities of proteins inherently present in the product. If these products are utilized with this in mind then the fat content need not be objectionable since the significant quantities of vitamins present are sufficient to permit of balancing the product with other protein containing materials inherently low in vitamin content while at the same time producing a resultant feed characterized particularly by its water-soluble vitamin content.

While certain novel features of the invention have been disclosed herein, and are pointed out in the annexed claims, it will be understood that various omissions, substitutions and changes may be made by those skilled in the art without departing from the spirit of the invention.

What is claimed is:

1. In producing a feed or feed supplement containing protein, fat and carbohydrates in predetermined amounts together with growth-promoting factors, a method which comprises intimately intermixing ground raw fish with a predetermined quantity of a comminuted pectin containing water absorbent pomace of vegetable origin to release the occluded water originally present in the fish tissue and to form a mixture from which the water released from the tissue may be readily evaporated at a temperature low enough to prevent substantial destruction of vitamins initially present in said cell tissue, then dehydrating the mixture at such relatively low temperature whereby a substantially dry farinaceous residue resistant to putrefaction and containing animal growth-promoting factors initially present in said fish is produced.

2. In producing a feed or feed supplement containing protein, fat and carbohydrates in predetermined amounts together with growth-promoting factors, a method which comprises intimately intermixing cell tissue of raw fish with a predetermined quantity of a comminuted water absorbent material of vegetable origin containing appreciable amounts of pectin to release the occluded water originally present in said cell tissue and to form a mixture from which the water released from the cell tissue may be readily evaporated at a temperature low enough to prevent substantial destruction of vitamins initially present in said cell tissue, separating oil thereby freed from the cell tissue, then dehydrating the mixture at such temperature whereby a substantially dry farinaceous residue resistant to putrefaction and containing animal growth-promoting factors initially present in the fish is produced.

3. A method of making a feed or feed supplement containing protein, fat and carbohydrates together with growth-promoting factors which comprises intermixing cell tissue of raw fish with a predetermined quantity of comminuted pomace from the class of products of the vegetable kingdom containing appreciable amounts of pectin whereby the pectin containing material is caused to release the water occluded in said cell tissue to form a mixture from which the released water may be readily evaporated, dehydrating said mixture at a temperature sufficiently low to prevent substantial destruction of vitamins originally present in said cell tissue to produce a substantially dry farinaceous product.

4. A method of making a feed or feed supplement which comprises intermixing cell tissue of raw fish with a predetermined quantity of comminuted pomace of sweet potato whereby the pomace is caused to release the water occluded in said cell tissue to form a mixture from which the released water may be readily evaporated, dehydrating said mixture at a temperature sufficiently low to prevent substantial destruction of vitamins originally present in said cell tissue to produce a substantially dry farinaceous residue resistant to putrefaction and containing protein, fat and carbohydrates together with health promoting factors initially present in said fish tissue.

5. A method of making a feed or feed supplement which comprises intermixing cell tissue of raw fish with a predetermined quantity of comminuted, substantially dry, pomace from the class of vegetative products which contain appreciable quantities of pectin including sweet potato, tomato and citrus fruit, whereby the pomace is caused to release the water occluded in said cell tissue to form a mixture from which the released water may be readily evaporated, dehydrating said mixture at a temperature sufficiently low as not to cause substantial destruction of vitamins initially present in said cell tissue to produce a substantially dry farinaceous residue resistant to putrefaction and containing protein, fat and carbohydrates together with growth-promoting factors initially present in the fish tissue.

6. A method of producing a product suitable for feeding to animals which comprises intermixing minced raw fish with a pectin containing pomace derived from a vegetable source and having water absorptive qualities in the proportion of 20% to 50% of said pomace and 50% to 80% of said fish, to release water occluded in the cell tissue of said fish whereby said water may readily be evaporated from said mass at relatively low temperature, then dehydrating the mass without permitting appreciable putrefaction at a temperature below that which would destroy material quantities of vitamins initially present in said fish and continuing the dehydration until the resultant product is substantially dry and farinaceous.

7. A method of producing a product suitable for feeding to animals which comprises intermixing minced raw fish or offal with a comminuted, substantially dry, pomace from the group consisting of sweet potato, tomato and citrus fruit in sufficient quantity to release substantially all the water occluded in the cell tissue of said fish and form a crumbly moist mass, then evaporating water from said mass at a temperature not exceeding that which would materially destroy the vitamins in said fish until the resultant residue is substantially dry.

8. A method of producing a product suitable for feeding to animals which comprises intermixing minced raw fish or offal with a comminuted pomace from the group consisting of sweet potato, tomato and citrus fruit in sufficient quantity to release substantially all the water occluded in the cell tissue of said fish and form a crumbly moist mass, then evaporating water from said mass at a temperature not exceeding about 130° F. until the resultant residue is substantially dry.

CLARENCE WALTER WHITMOYER.
WILLIAM JAMES MOORE.